US012598668B2

(12) United States Patent
Kela et al.

(10) Patent No.: US 12,598,668 B2
(45) Date of Patent: Apr. 7, 2026

(54) SURVIVAL TIME STATE TRIGGERING AND FALLBACK FOR DUPLICATION WITH DUAL-CONNECTIVITY

(71) Applicant: Nokia Technologies Oy, Espoo (FI)

(72) Inventors: Kalle Petteri Kela, Espoo (FI); Ping-Heng Kuo, Cambridge (GB)

(73) Assignee: Nokia Technologies Oy, Espoo (FI)

( * ) Notice: Subject to any disclaimer, the term of this patent is extended or adjusted under 35 U.S.C. 154(b) by 213 days.

(21) Appl. No.: 18/577,373

(22) PCT Filed: Jul. 14, 2022

(86) PCT No.: PCT/EP2022/069731
§ 371 (c)(1),
(2) Date: Jan. 8, 2024

(87) PCT Pub. No.: WO2023/025461
PCT Pub. Date: Mar. 2, 2023

(65) Prior Publication Data
US 2024/0349386 A1 Oct. 17, 2024

Related U.S. Application Data

(60) Provisional application No. 63/236,767, filed on Aug. 25, 2021.

(51) Int. Cl.
*H04W 76/27* (2018.01)
*H04L 1/00* (2006.01)

(52) U.S. Cl.
CPC ........... *H04W 76/27* (2018.02); *H04L 1/0017* (2013.01)

(58) Field of Classification Search
None
See application file for complete search history.

(56) References Cited

U.S. PATENT DOCUMENTS 11,057,769 B2 * 7/2021 Vanchev ............. H04L 63/1416
11,277,876 B2 * 3/2022 Hahn .................... H04W 76/27
(Continued)

FOREIGN PATENT DOCUMENTS

EP          3952515 A1    2/2022
WO    2020/215796 A1    10/2020
WO    2020/223531 A1    11/2020

OTHER PUBLICATIONS

"3rd Generation Partnership Project; Technical Specification Group Radio Access Network; NR; Packet Data Convergence Protocol (PDCP) specification (Release 16)", 3GPP TS 38.323, V16.3.0, Mar. 2021, pp. 1-40.
(Continued)

*Primary Examiner* — Hassan A Phillips
*Assistant Examiner* — Gautam Sharma
(74) *Attorney, Agent, or Firm* — McCarter & English, LLP

(57) ABSTRACT

An apparatus and a method for a wireless communication system is provided, wherein, a number of medium access control entities associated with at least one active radio link control entity of a radio bearer is determined; at least one condition for switching a state associated with the radio bearer based, at least partially, on the determined number of medium access control entities is determined; determining that the determined at least one condition for switching the state associated with the radio bearer is satisfied; and switching the state associated with the radio bearer from a first state to a second state based, at least partially, on determining that the at least one condition for switching the state associated with the radio bearer is satisfied.

20 Claims, 7 Drawing Sheets

(56) References Cited

U.S. PATENT DOCUMENTS

| | | | | |
|---|---|---|---|---|
| 11,395,303 | B2 * | 7/2022 | Yi ........................ | H04L 5/0044 |
| 2008/0049710 | A1 * | 2/2008 | Zeira ................... | H04W 52/54 370/345 |
| 2015/0282107 | A1 * | 10/2015 | Vrind ................... | H04W 76/19 370/252 |
| 2018/0310202 | A1 * | 10/2018 | Löhr .................... | H04W 76/27 |
| 2020/0274654 | A1 | 8/2020 | Loehr et al. | |
| 2021/0051766 | A1 | 2/2021 | Chen | |
| 2021/0068186 | A1 | 3/2021 | Wu | |
| 2021/0105844 | A1 | 4/2021 | Joseph et al. | |
| 2022/0046754 | A1 * | 2/2022 | Xu ........................ | H04W 80/02 |
| 2022/0070103 | A1 * | 3/2022 | Kanamarlapudi ........................... | H04W 28/0278 |
| 2022/0109545 | A1 * | 4/2022 | Kuo ...................... | H04L 5/0098 |
| 2022/0330049 | A1 * | 10/2022 | Tan ...................... | H04W 24/02 |
| 2023/0413151 | A1 * | 12/2023 | Tan .......................... | H04L 1/08 |
| 2023/0421312 | A1 * | 12/2023 | Fu ........................ | H04L 1/1848 |

OTHER PUBLICATIONS

"3rd Generation Partnership Project; Technical Specification Group Radio Access Network; NR; Medium Access Control (MAC) protocol specification (Release 16)", 3GPP TS 38.321, V16.4.0, Mar. 2021, pp. 1-157.

"3rd Generation Partnership Project; Technical Specification Group Services and System Aspects; Service requirements for cyber-physical control applications in vertical domains; Stage 1 (Release 18)", 3GPP TS 22.104, V18.1.0, Jun. 2021, pp. 1-81.

"Summary of Email Discussion 506—R17 IIOT QoS", 3GPP TSG-RAN WG2 Meeting #114, R2-2104897, Agenda: 8.5.4, CATT, May 19-27, 2021, 45 pages.

"An Overview of Survival Time Enhancements", 3GPP TSG-RAN WG2 Meeting #116 Electronic, R2-2110444, Agenda: 8.5.4, Nokia, Nov. 1-12, 2021, 5 pages.

"Report for Rel-17 Small data and URLLC/IIoT", 3GPP TSG-RAN WG2 Meeting #114 electronic, R2-2106474, InterDigital, May 2021, pp. 1-13.

International Search Report and Written Opinion received for corresponding Patent Cooperation Treaty Application No. PCT/EP2022/069731, dated Oct. 31, 2022, 12 pages.

"Discussion on entering and exiting survival time state", 3GPP TSG-RAN WG2 Meeting #113-bis, R2-2103896, Futurewei, Apr. 12-20, 2021, 2 pages.

Office action received for corresponding European Patent Application No. 22751684.6, dated Jan. 16, 2025, 5 pages.

Office action received for corresponding Canadian Patent Application No. 3223522, dated Jan. 23, 2025, 5 pages.

Office action received for corresponding Korean Patent Application No. 2024-7007692, dated Sep. 19, 2025, 6 pages of office action and no pages of translation available.

* cited by examiner

FIG. 6

710
Rule for triggering survival time state is fulfilled?

720

730

740

800 determine a number of
medium access control
entities associated with at
least one active radio link          810
control entity of a radio
bearer

determine at least one
condition for switching a
state of associated with the
radio bearer based, at
least partially, on the          820
determined number of
medium access control
entities

determine that the
determined at least one
condition for switching the
state of associated with the          830
radio bearer is satisfied

switch the state of associated with
the radio bearer from a first state to
a second state based, at least
partially, on determining that the at          840
least one condition for switching the
state of associated with the radio
bearer is satisfied

FIG. 8

SURVIVAL TIME STATE TRIGGERING AND FALLBACK FOR DUPLICATION WITH DUAL-CONNECTIVITY

RELATED APPLICATION

This application was originally filed as PCT Application No. PCT/EP2022/069731 on Jul. 14, 2022, which claims priority from U.S. Provisional Application No. 63/236,767 filed on Aug. 25, 2021, both of which are incorporated herein by reference in their entirety.

TECHNICAL FIELD

The example and non-limiting embodiments relate generally to PDCP duplication and, more particularly, to triggering of a DRB state switch.

BACKGROUND

It is known, in network communication, to activate PDCP duplication based on dynamic signaling from the base station, such as retransmission grant triggered by HARQ NACK.

SUMMARY

The following summary is merely intended to be illustrative. The summary is not intended to limit the scope of the claims.

In accordance with one aspect, an apparatus comprising: at least one processor; and at least one non-transitory memory including computer program code; the at least one memory and the computer program code configured to, with the at least one processor, cause the apparatus at least to perform: determine a number of medium access control entities associated with at least one active radio link control entity of a radio bearer; determine at least one condition for switching a state associated with the radio bearer based, at least partially, on the determined number of medium access control entities; determine that the determined at least one condition for switching the state associated with the radio bearer is satisfied; and switch the state associated with the radio bearer from a first state to a second state based, at least partially, on determining that the at least one condition for switching the state associated with the radio bearer is satisfied.

In accordance with one aspect, a method comprising: determining a number of medium access control entities associated with at least one active radio link control entity of a radio bearer; determining at least one condition for switching a state associated with the radio bearer based, at least partially, on the determined number of medium access control entities; determining that the determined at least one condition for switching the state associated with the radio bearer is satisfied; and switching the state associated with the radio bearer from a first state to a second state based, at least partially, on determining that the at least one condition for switching the state associated with the radio bearer is satisfied.

In accordance with one aspect, an apparatus comprising means for performing: determining a number of medium access control entities associated with at least one active radio link control entity of a radio bearer; determining at least one condition for switching a state associated with the radio bearer based, at least partially, on the determined number of medium access control entities; determining that the determined at least one condition for switching the state associated with the radio bearer is satisfied; and switching the state associated with the radio bearer from a first state to a second state based, at least partially, on determining that the at least one condition for switching the state associated with the radio bearer is satisfied.

In accordance with one aspect, a non-transitory computer-readable medium comprising program instructions stored thereon which, when executed with at least one processor, cause the at least one processor to: determine a number of medium access control entities associated with at least one active radio link control entity of a radio bearer; determine at least one condition for switching a state associated with the radio bearer based, at least partially, on the determined number of medium access control entities; determine that the determined at least one condition for switching the state associated with the radio bearer is satisfied; and cause switching of the state associated with the radio bearer from a first state to a second state based, at least partially, on determining that the at least one condition for switching the state associated with the radio bearer is satisfied.

BRIEF DESCRIPTION OF THE DRAWINGS

The foregoing aspects and other features are explained in the following description, taken in connection with the accompanying drawings, wherein:

FIG. 6 is a diagram illustrating features as described herein;

FIG. 8 is a flowchart illustrating steps as described herein.

DETAILED DESCRIPTION OF EMBODIMENTS

Figure 1:
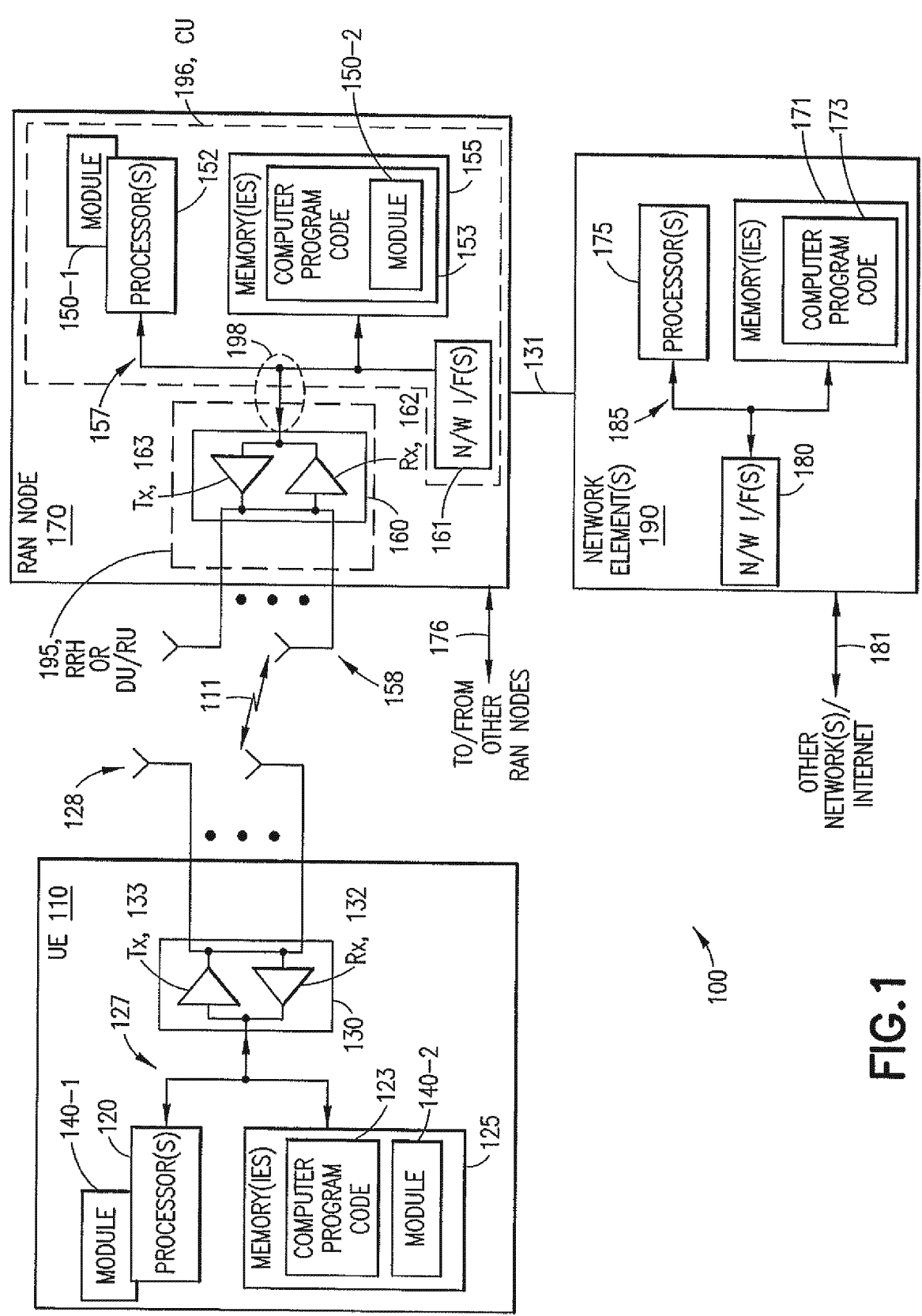
FIG. 1 is a block diagram of one possible and non-limiting example system in which the example embodiments may be practiced.

The following abbreviations that may be found in the specification and/or the drawing figures are defined as follows:

3GPP third generation partnership project 5G fifth generation

5GC 5G core network

AMF access and mobility management function

CA carrier aggregation

CC component carrier

CU central unit

DC dual-connectivity

DRB data radio bearer

DU distributed unit eNB (or eNodeB) evolved Node B (e.g., an LTE base station)

EN-DC E-UTRA-NR dual connectivity en-gNB or En-gNB node providing NR user plane and control plane protocol terminations towards the UE, and acting as secondary node in EN-DC E-UTRA evolved universal terrestrial radio access, i.e., the LTE radio access technology gNB (or gNodeB) base station for 5G/NR, i.e., a node providing NR user plane and control plane protocol terminations towards the UE, and connected via the NG interface to the 5GC HARQ hybrid automatic repeat request I/F interface IIOT industrial Internet of Things L1 layer 1

LTE long term evolution

MAC medium access control

MgNB master gNB

MME mobility management entity ng or NG new generation ng-eNB or NG-eNB new generation eNB NR new radio N/W or NW network PDCP packet data convergence protocol PDU protocol data unit PHY physical layer RAN radio access network RF radio frequency RLC radio link control RRC radio resource control RRH remote radio head RS reference signal RU radio unit Rx receiver SDAP service data adaptation protocol SgNB secondary gNB SGW serving gateway SMF session management function ST survival time TSCAI Time Sensitive Communications Assistance Information Tx transmitter UE user equipment (e.g., a wireless, typically mobile device)

UPF user plane function

URLLC ultra-reliable low-latency communication

Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or a ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell will perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(s)) and/or user plane functions (UPF(s)) and/or session management function(s) (SMF(s)). Such core network functionality for LTE may include MME (Mobility Management Entity)/SGW (Serving Gateway) functionality. These are merely illustrative functions that may be supported by the network element(s) 190, and note that both 5G and LTE functions might be supported. The RAN node 170 is coupled via a link 131 to a network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network k functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Features as described herein generally relate to 5G/NR (rel.17) and Survival Time (ST) requirement. TS 22.104 defines ST as "the time that an application consuming a communication service may continue without an anticipated message." The information of an application level requirement, such as ST, may be provided to RAN by the core network via Time Sensitive Communications Assistance Information (TSCAI), such that RAN may utilize such information to avoid survival time violation by improving the reliability of the associated radio link; this is an objective in the Rel-17 NR IIOT/URLLC (Industrial Internet of Things/ultra-reliable low-latency communication) work item. Features as described herein may relate to increasing the reliability for UL transmissions once ST has been triggered/entered in the case of dual connectivity.

Example embodiments of the present disclosure may relate to how a UE may trigger entering and exiting a Survival Time state autonomously for uplink transmissions. A technical effect of providing ST information in TSCAI may be to enable gNB and/or UE to use (i.e. perform RAN action) the ST information to improve the associated link reliability so that the survival time requirement may be met.

It has been proposed that erroneous UL transmission may trigger a data radio bearer (DRB) associated with a UE to enter a survival time state. A UE may be associated with one or more DRBs. Once in survival time state, a DRB/UE may increase reliability for subsequent UL transmissions. PDCP duplication activation or duplication state changing may be considered as a method for increasing reliability when survival time state is entered. As a DRB may have up to 4 RLC entities, and duplication may already be activated even in normal state, activating PDCP duplication upon survival time state may be more generally described as "changing the active RLC set" upon survival time state. In other words, a different set of RLC may be active during survival time state than during normal state.

An "active" RLC entity may mean an RLC entity to which the PDCP may submit a copy of a PDCP PDU for further processing. An RLC entity may be configured, but not active/not activated/inactive. A configured but inactive RLC entity may not receive a PDCP PDU from the PDCP; the PDCP may not submit the PDCP PDU to an inactive RLC entity.

Figure 2:
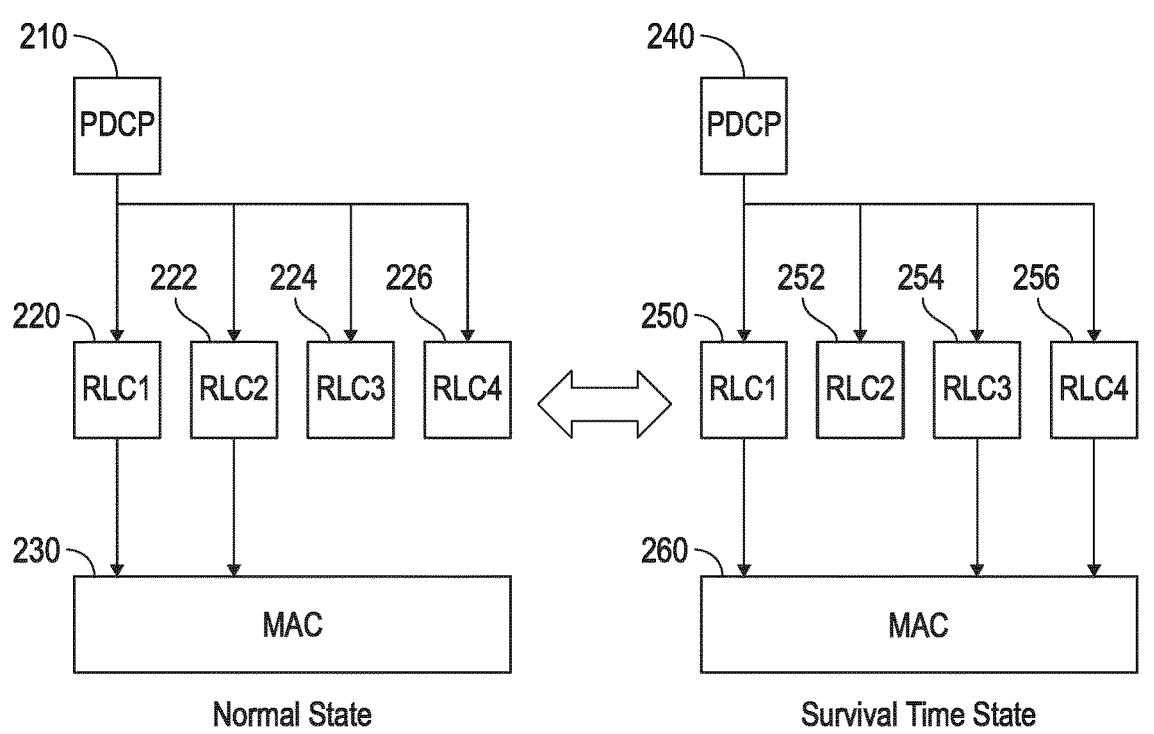
FIG. 2 is a diagram illustrating features as described herein.

Referring now to FIG. 2, illustrated is an example in which different sets of RLC entities may be used for transmitting copies of PDCP PDUs when a DRB/UE is in a "normal" state than when the DRB/UE is in a "survival time" state. In the example, the DRB of a UE may only use RLC1 (220) and RLC2 (222) to transmit a PDCP (210) PDU to MAC layer (230) during the normal state. During the normal state, RLC3 (224) and RLC4 (226) may not be used for PDU transmission. When the radio bearer switches to the survival time state, RLC1 (250), RLC3 (254), and RLC4 (256) may be used instead to transmit a PDCP (240) PDU to MAC layer (260) (and the number of copies may also be increased by 1). During the survival time state, RLC2 (252) may not be used for PDU transmission. The set of RLC entities to be used in each of the states may be pre-configured by the gNB. The DRB/UE may switch from the normal state to the survival time state based on a flag raised by a lower layer, such as indication explicitly/implicitly indicated hybrid automatic repeat request (HARQ)-based error received from the gNB at MAC layer (230). This indication from the gNB may be implemented as a Downlink control information (DCI) conveyed by Physical Downlink a Control (PDCCH), such Channel as retransmission grant or a configured grant activation command. Other flags configured to cause the UE to switch states may be possible.

PDCP duplication activation or duplication state changing may be used to increase the reliability once ST state has been entered. If PDCP duplication is configured based on carrier aggregation (CA), which may mean that all RLC under a DRB are associated to the same MAC entity, the operation mentioned above with respect to FIG. 2 may be straightforward, as only one MAC entity may be involved for duplication of this DRB; there may be no ambiguity. However, duplication may be configured in dual-connectivity (DC) as well, where two MAC entities (corresponding to different cell groups or base stations) may be involved. In the case where uplink PDCP duplication is configured with dual connectivity (DC), such that two MAC entities are involved for PDCP duplication, if the ST state is then triggered based on a MAC-layer indication (e.g. HARQ feedback), it may be ambiguous for the UE to determine whether a data radio bearer should enter a survival time state, as different feedback may be provided by the two MAC entities (e.g. one positive feedback and one negative feedback, or one raised a flag and one does not raise a flag). In other words, it may be undefined how/when a DRB enters or exits survival time state when duplication (which may be activated autonomously based on HARQ feedback) is configured with dual connectivity, especially if a UE has two or more RLCs associated to two (different) MAC entities activated for packet duplication (i.e. previous to survival time state, during normal mode).

Figure 3:
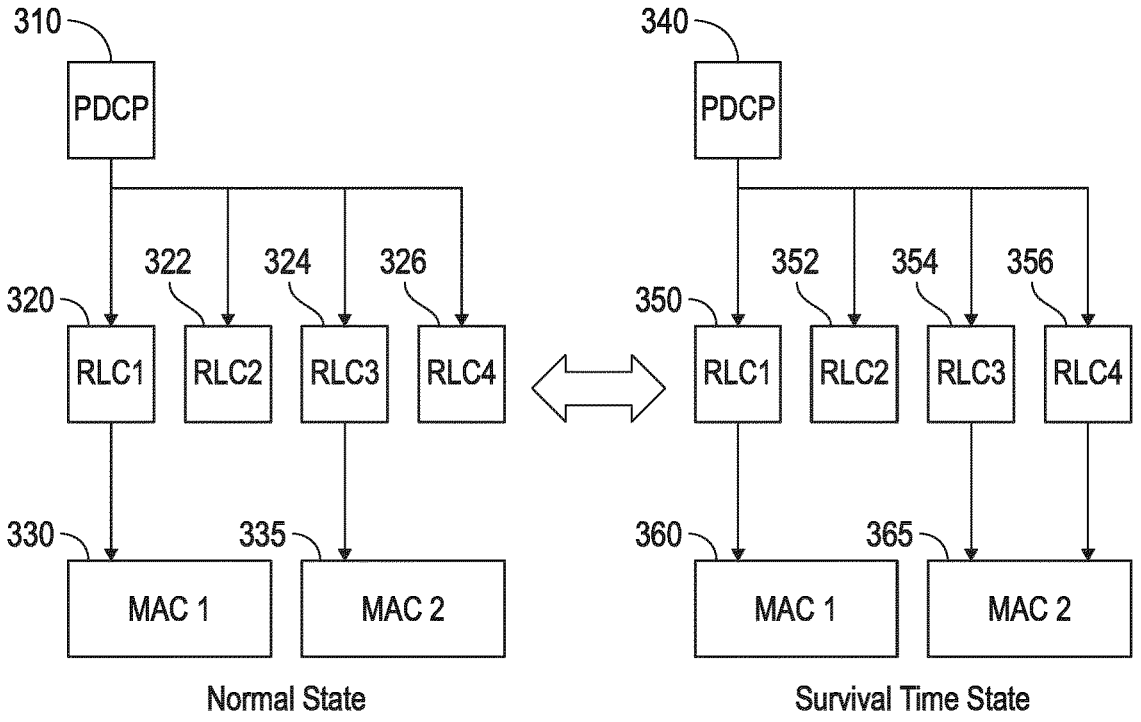
FIG. 3 is a diagram illustrating features as described herein.

FIG. 3 illustrates a case in which two MAC entities are involved for duplication of a DRB. In the normal state, the UE/DRB may be configured to use RLC1 (320) and RCL3 (324) to transmit a PDCP (310) PDU to MAC1 (330) and MAC2 (335), respectively. During the normal state, RLC2 (322) and RLC4 (326) may not be used for PDU transmission. In the survival time state, the UE/DRB may be configured to use RLC1 (350), RCL3 (354), and RLC4 (356) to transmit a PDCP (340) PDU to MAC1 (360) and MAC2 (365), respectively. During the survival time state, RLC2 (352) may not be used for PDU transmission.

Ambiguity may arise if, for example, while a DRB associated with a UE is in a survival time state, MAC1 (360) determines to switch the state from the survival time state to the normal state, and MAC2 (365) does not determine to switch the state from the survival time state to the normal state. For example, MAC1 (360) may determine to switch the state based on a received DCI or control signal. Such a determination may take the form of an internal flag. One or both of MAC1 (360) and MAC2 (365) may transmit an indication to PDCP (340) based on their individual determinations. If the indications received at PDCP (340) do not match, or if only one indication is received, it may be unclear whether a state of the DRB should be maintained or switched.

While the examples of FIGS. 2 and 3 illustrate four RLC entities, a UE/DRB may be configured with a different number of RLC entities.

Figure 4:
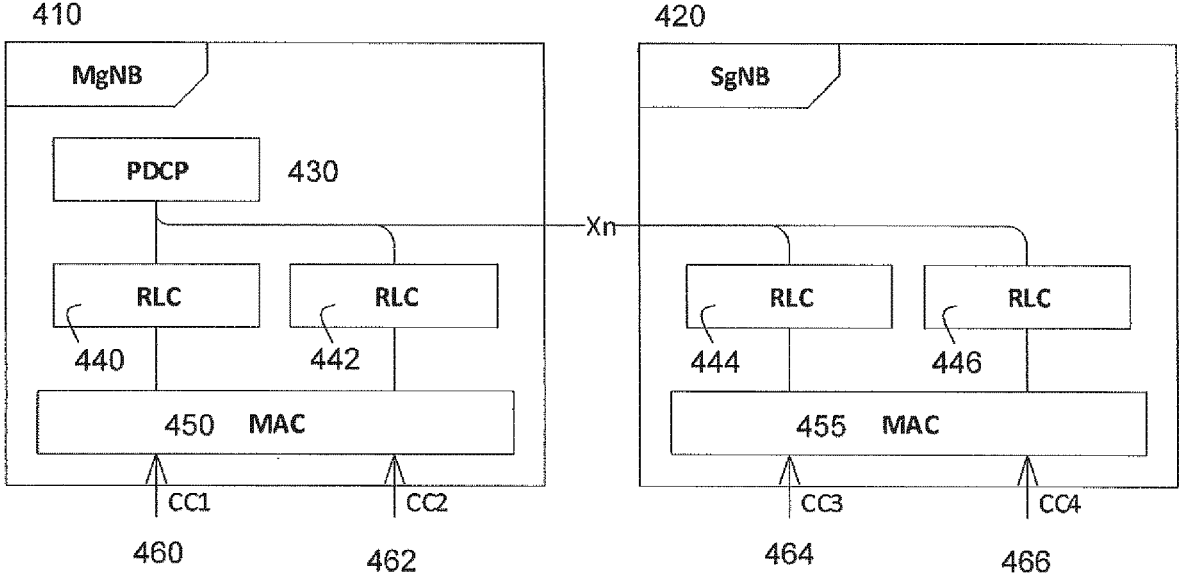
FIG. 4 is a diagram illustrating features as described herein.

At the network side, transmission from the uplink MAC entity 1 (330, 360) and 2 (335, 365) (as shown in FIG. 3) of the UE may be processed by a master gNB (MgNB, where PDCP is hosted) and a secondary gNB (SgNB) respectively, as depicted in FIG. 4. The gNBs may coordinate over Xn interface to decode the data.

Referring now to FIG. 4, illustrated is an example of uplink packet duplication (or multiplication) using up to 4 RLC entities and associated component carriers (CCs). Communication between gNBs may be carried out through an Xn interface. The MgNB (410) may comprise a PDCP entity (430), two RLC entities (440, 442), and a MAC entity (450). The MAC entity (450) may be configured to receive uplink packets via CC1 (460) and CC2 (462). The SgNB (420) may comprise two RLC entities (444, 446) and a MAC entity (455). The MAC entity (455) may be configured to receive uplink packets via CC3 (464) and CC4 (466). While in the example of FIG. 4, each MAC entity is associated with two component carriers, a different numbers of component carriers may be possible, and the number of component carriers may differ among MAC entities.

If a UE is connected to both MgNB (410) and SgNB (420) in dual connectivity, a duplicated packet may be transmitted to each of MgNB (410) and SgNB (420). In such cases, it may not be clear how the DRB/UE should behave when UE has dual connectivity with packet duplication activated for normal state already (e.g. as shown in FIG. 3, RLC1 (320) and RLC3 (324) are activated in normal state, and as a result 2 MAC entities (330, 335) are involved). One or more of the following questions may arise:

When at least one RLC associating to each of the two MAC entities is activated during the normal state, there may be a question as to how the triggering condition of survival time state should be defined. In other words, it may be ambiguous for the UE to determine whether a DRB should enter survival time state if only one of these MAC entities provides negative feedback. For example, if a UE according to the normal state of FIG. 3 receives negative feedback from MAC1 (330) but not from MAC2 (335), it may be unclear whether the survival time state should be entered, because it may imply that the duplicated packet has been successfully delivered via MAC2 and hence survival time state triggering may not be needed. Other scenarios may be possible.

When at least one RLC associated with each of the two MAC entities is activated during the survival time state, there may be a question as to how the triggering condition of returning to normal state should be defined. In other words, it may be ambiguous for the UE to determine whether a DRB should enter normal state if only one of these MAC entities provides positive feedback. For example, if a UE according to the normal state of FIG. 3 receives positive feedback from MAC1 (360) but not from MAC2 (365), it may be unclear whether the normal state should be entered. Other scenarios may be possible.

Example embodiments of the present disclosure may define triggering and fallback rules when two MAC entities are involved in transmission of data, with survival time requirement, when survival time state triggering or fallback is based on a flag to be raised by a MAC entity(ies).

In an example embodiment of the present disclosure, an adaptive mechanism for the UE may be implemented, where ST state triggering rules may be selected in accordance with whether only one or both of the DRB/UE's RLC (Radio Link Control) entities are involved in transmitting data having a ST requirement from the radio bearer during the normal state. In example embodiments of the present disclosure, upon detecting a transmission error, a flag may be raised by the MAC to the higher layer (e.g. PDCP) to change the state to a ST state and, upon detecting a successful transmission, a flag may be raised to change the state to a normal state.

Currently, a gNB may be able to configure 1-4 active RLC entities per a PDCP for a UE to perform packet duplication (or multiplication) for the corresponding radio bearer. In an example embodiment, the gNB may be able to configure a set of active RLC entities for normal mode, and another set of active RLCs for survival time mode. Once the UE triggers survival time mode, the PDCP of the UE may start sending copies of a packet through RLC entities assigned for survival time state. Once UE decides to fall back to the normal mode, it may change the set of active RLCs to the set of RLCs assigned for the normal state/mode. A technical effect of gNB configuration of state-specific sets of active RLC entities may be to improve flexibility of UE autonomous duplication.

Example embodiments of the present disclosure may relate to cases in which duplication is configured in DC mode, i.e. two MAC entities are involved. If a survival time state is triggered based on a MAC-layer indication (e.g. HARQ feedback), it may be ambiguous for the UE to determine whether a DRB should enter survival time state when different feedback is provided by the two MAC entities (e.g. one positive feedback and one negative feedback, i.e. the retransmission grant may be received on one MAC entity but not the other one MAC entity). Example embodiments of the present disclosure may define triggering rules for entering the survival time state and/or entering the normal state.

In an example embodiment, if at least one RLC for each MAC entity is already activated in the normal state (i.e. both MAC entities are handling transmission of data from this DRB even in normal state, because of duplication or split bearer operation), the DRB may enter a survival time state as long as one of the two MAC entities raise a flag about transmission error of the consecutive N≥1 preceding packet(s) from this DRB. In other words, if neither of the two MAC entities provides negative feedback, the DRB may continue in a normal state; negative feedback from one MAC entity is a sufficient trigger to enter a survival time state. In an alternative example embodiment, the DRB may enter a survival time state if and only if both of the MAC entities raise a flag about transmission error of the consecutive N≥1 preceding packet(s) from this DRB. In other words, if only one of the two MAC entities provides negative feedback, the DRB may continue in a normal state; negative feedback from only one MAC entity is an insufficient trigger to enter a survival time state. In an alternative example embodiment, the DRB may enter a survival time state only if the MAC entity associated with the primary RLC entity raises a flag about transmission error of the consecutive N≥1 preceding packet(s) from this DRB. In other words, if negative feedback is only received from a MAC entity associated with a secondary RLC entity, the DRB may continue in a normal state. In an alternative example embodiment, the DRB may enter a survival time state only if the MAC entity associated with RLC entity (ies) other than the primary RLC raise a flag about transmission error of the consecutive N≥1 preceding packet(s) from this DRB. In other words, if negative feedback is only received from the MAC entity associated with the primary RLC, the DRB may continue in a normal state.

In an example embodiment, the UE, or the PDCP of the DRB, may be pre-configured by the gNB about which of the above rules it should apply to determine whether survival time state should be entered from the normal state.

In an example embodiment, if only RLC(s) for one of the MAC entities are activated in the normal state (i.e. only one MAC entity is handling transmission of data from this DRB even in normal state), the DRB may enter a survival time state only if the MAC entity associated to the already activated RLC entity (ies) raise a flag about transmission error of the consecutive N≥1 preceding packet(s) from this DRB.

In an example embodiment, a new UE adaptive behavior may be implemented in which the survival time state triggering rule may be selected in accordance with whether only one of, or both, MAC entities is/are involved in transmitting the data from the DRB during the normal state.

In an example embodiment, when at least one RLC for each MAC entity is activated during the survival time state/mode (i.e. both MAC entities are involved in transmission of data from the DRB in survival time state), the DRB may fall back to the normal state as long as one of the two MAC entities raises a flag about successful transmission of the consecutive N≥1 preceding packet(s) from this DRB. In other words, if one MAC entity provides positive feedback and one MAC entity provides negative feedback, the DRB may fall back to the normal state.

In an alternative example embodiment, when at least one RLC for each MAC entity is activated during the survival time state, the DRB may fall back to the normal state if and only if both of the two MAC entities raise a flag about successful transmission of the consecutive N≥1 preceding packet(s) from this DRB. In other words, if one MAC entity provides positive feedback and one MAC entity provides negative feedback, the DRB may remain in the survival time state.

In an alternative example embodiment, when at least one RLC for each MAC entity is activated during the survival time state, the DRB may fall back to the normal state if and only if the MAC entity associated with at least one active RLC for the normal state raises a flag about successful transmission of the consecutive N≥1 preceding packet(s) from this DRB. In other words, positive feedback from a MAC entity associated with a RLC, that is inactive in normal state, may not be sufficient to trigger fallback to the normal state.

In an alternative example embodiment, when at least one RLC for each MAC entity is activated during the survival time state, the DRB may fall back to the normal state if and only if the MAC entity associated with the primary RLC raises a flag about successful transmission of the consecutive N≥1 preceding packet(s) from this DRB. In other words, positive feedback from a MAC entity associated with a secondary RLC entity may be insufficient to trigger fallback to a normal state.

In an example embodiment, the UE, or the PDCP of the DRB, may be pre-configured by the gNB about which of the above rules it should apply to determine if it should fall back to the normal state from the survival time state.

In an example embodiment, in cases where only one MAC entity is involved for transmission of data from the DRB during the survival time mode, the UE/DRB may only consider if a flag about successful transmission of the consecutive N≥1 preceding packet(s) from this DRB is raised from the MAC entity that is associated with the active RLC for the survival time state.

Figure 5:
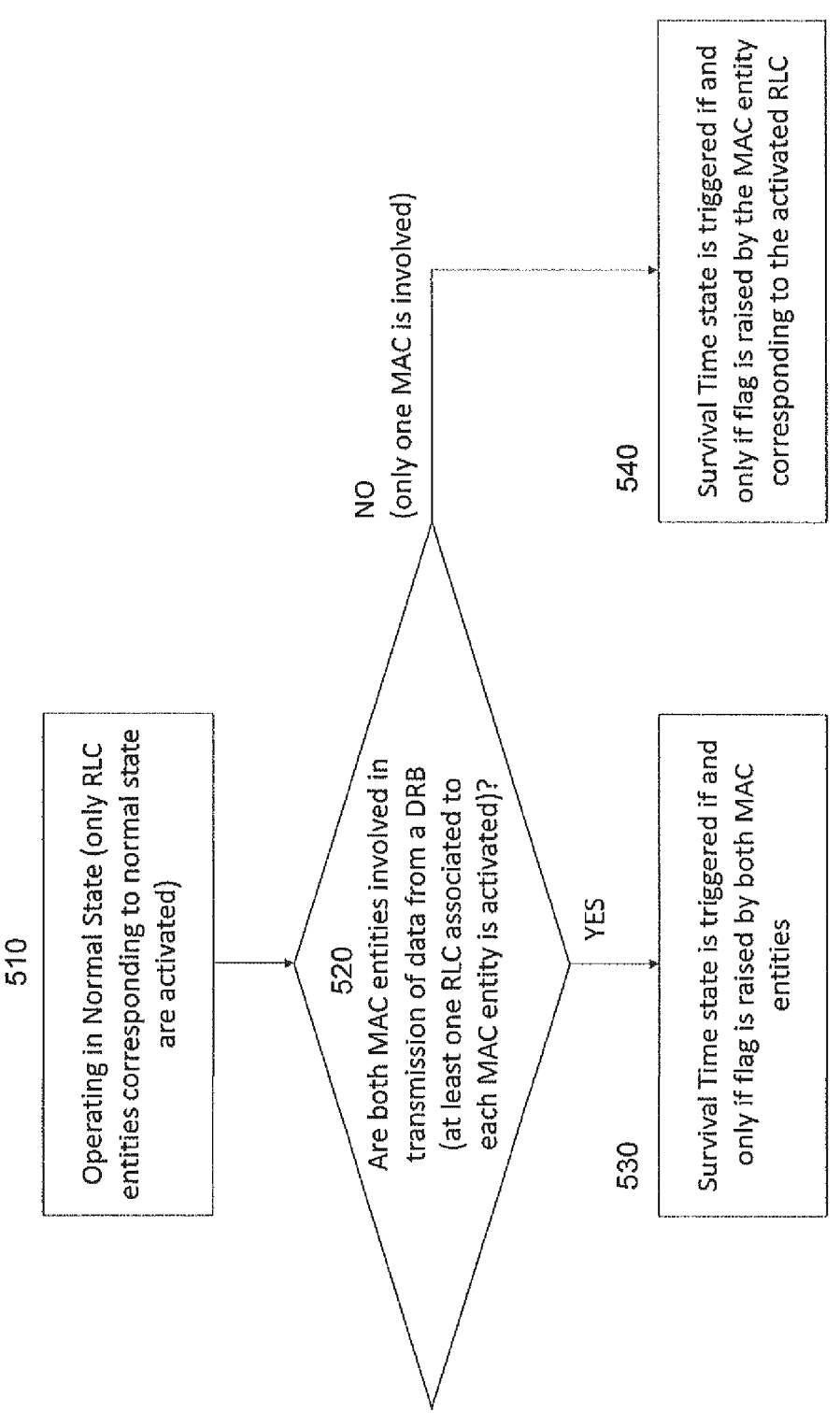
FIG. 5 is a diagram illustrating features as described herein.

Referring now to FIG. 5, illustrated is a flowchart demonstrating example of survival time triggering (and fallback) when a UE may have one or multiple MAC entities involved in transmission of data from a DRB, with survival time requirement.

At 510, the UE/DRB may be operating in a normal state (i.e. only RLC entities corresponding to a normal state are activated). At 520, the UE/DRB may determine whether both MAC entities are involved in transmission of data from a DRB (i.e. whether at least one RLC associated with each MAC entity is activated).

If both MAC entities are involved in transmission of data from a DRB, at 530, the survival time state may be triggered if and only if a flag is raised by both MAC entities. This example is merely illustrative; in another example, another rule for triggering survival time state may be applied.

If only one MAC entity is involved in transmission of data from a DRB, at 540, the survival time state may be triggered if and only if a flag is raised by the MAC entity corresponding to the activated RLC. This example is merely illustrative; in another example, another rule for triggering survival time state may be applied.

Figure 6:
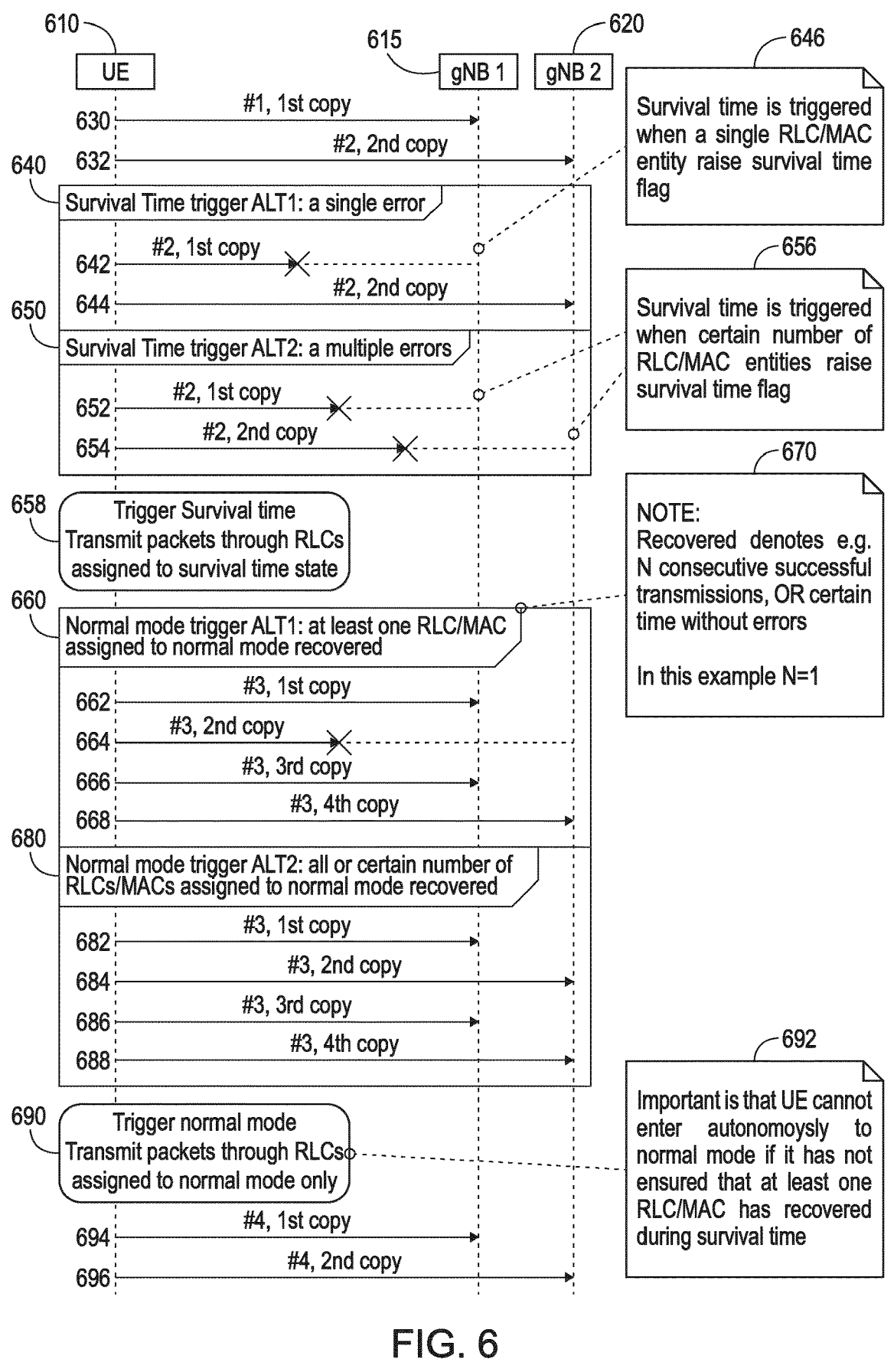

Referring now to FIG. 6, illustrated is an example of dual connection normal mode and survival time triggering. In the example, DRB/UE 610 may have 2 RLCs associated to different gNBs (615, 620) configured for normal mode, and 4 RLCs configured for survival time state. At first, the DRB/UE (620) may be in a normal mode and may send one copy of a packet through 2 CCs belonging to different gNBs (e.g. at 630 may send a first copy of packet #1 to gNB1 (615), and at 632 may send a second copy of packet #1 to gNB2 (620)).

Once survival time is triggered due to an error on a single or multiple CCs/RLCs, DRB/UE (610) may autonomously start using RLCs associated to survival time state. For example, at 640, a single error may trigger a switch to a survival time state. The UE (610) may unsuccessfully transmit, at 642, a first copy of packet #2 to gNB1 (615), and may successfully transmit, at 644, a second copy of packet #2 to gNB2 (620). At 646, survival time may be triggered when a single RLC/MAC entity raises a survival time flag. In another example, at 650, multiple errors may trigger a switch to a survival time state. The UE (610) may unsuccessfully transmit, at 652, a first copy of packet #2, and may unsuccessfully transmit, at 654, a second copy of packet #2. At 656, survival time may be triggered when a certain number of RLC/MAC entities raise a survival time flag. While in the example at 650 two survival time flags may be raised, a different number of survival time flags may also be possible.

At 658, the DRB/UE (610) may determine to trigger a survival time state. The UE (610) may transmit packets through RLCs assigned to the survival time state.

Fall back to a normal state/mode may be triggered by one, some, or all RLC/MAC assigned to normal mode recovering. "Recover" may denote that "N" consecutive successful transmissions have occurred, or that a certain time without errors has elapsed/passed. In this example, N=1 (670).

For example, at 660, fall back to a normal state may be triggered where at least one RLC/MAC that is assigned to the normal state recovers. The UE (610) may successfully transmit, at 662, a first copy of packet #3 to gNB1 (615); unsuccessfully transmit, at 664, a second copy of packet #3 to gNB2 (620); successfully transmit, at 666, a third copy of packet #3 to gNB1 (615); and successfully transmit, at 668, a fourth copy of packet #3 to gNB2 (620).

In another example, at 680, fall back to a normal state may be triggered where all or a certain number of RLCs/MACs that are assigned to the normal state recover. The UE (610) may successfully transmit, at 682, a first copy of packet #3 to gNB1 (615); successfully transmit, at 684, a second copy of packet #3 to gNB2 (620); successfully transmit, at 686, a third copy of packet #3 to gNB1 (615); and successfully transmit, at 688, a fourth copy of packet #3 to gNB2 (620).

At 690, the DRB/UE (610) may determine to trigger a normal state. The UE (610) may transmit packets through RLCs assigned to normal state/mode only. At 692, it may be noted that DRB/UE (610) may not enter normal state autonomously if it has not ensured that at least one RLC/MAC has recovered during survival time. At 694, UE (610) may successfully transmit a first copy of packet #4 to gNB #1. At 696, the UE (610) may successfully transmit a second copy of packet #4 to gNB2 (620).

Figure 7:
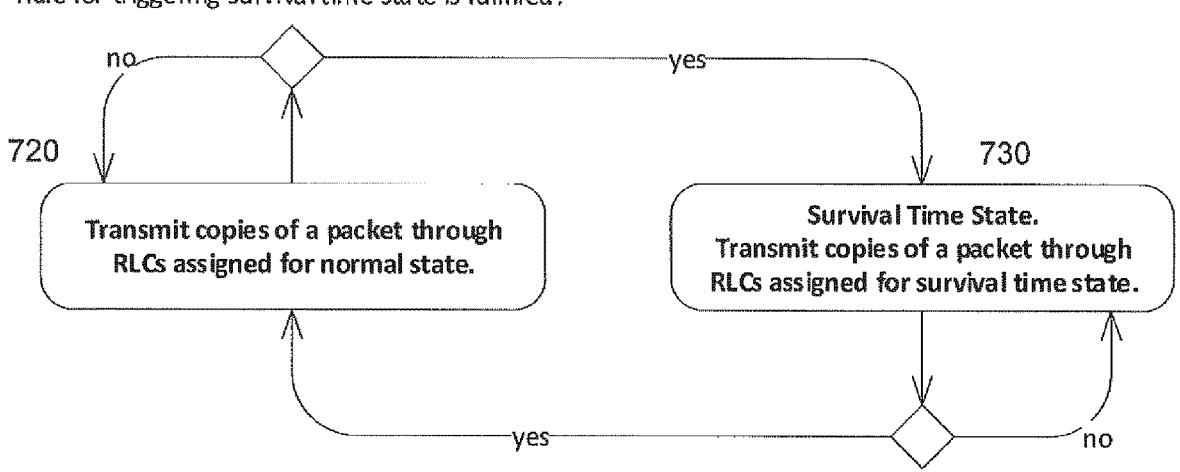
FIG. 7 is a diagram illustrating features as described herein.

In an example embodiment, different sets of RLCs may be considered to be active in a normal state/mode and/or survival time state/mode may be configured, for example, via MAC CE or RRC configuration. Predefined rules to be specified in 3GPP may be used for triggering different states, as shown in FIG. 7. FIG. 7 illustrates an example flow diagram for triggering survival time state/mode and normal state/mode using pre-defined rules. At 710, a DRB/UE may determine whether a rule for triggering survival time state is fulfilled. A rule for triggering survival time state may be according to an example embodiment of the present disclosure. If no, at 720, the UE may transmit copies of a packet through RLCs assigned for normal state. If yes, at 730, the DRB/UE may enter a survival time state. The UE may transmit copies of a packet through RLCs assigned for survival time state. At 740, the DRB/UE may determine whether a rule for triggering normal state is fulfilled. Said rule may ensure that RLCs associated to normal mode are reliable. In other words, a rule may ensure that, if the state of the DRB is switched to the normal state, no or few errors will happen while using DRBs configured for the normal state. For example, the RLCs associated with the normal state may be considered reliable after N consecutive successful transmissions, or after a certain time elapses without errors. A rule for triggering normal state may be according to an example embodiment of the present disclosure.

In an example embodiment, a UE may receive a packet duplication configuration for normal state and for survival time state. The configuration may include a different set of RLCs for normal state, and a different set of RLCs for survival time state. The number of RLCs assigned for normal mode/state and survival time mode/state might be the same or different.

In an example embodiment, a UE may have one or two MAC entities involved for transmission of data, with survival time requirement. A MAC entity may raise a flag (i.e. indicating survival time state or normal state triggering to PDCP entity) triggering survival time state or normal state.

In an example embodiment, a MAC entity may raise a survival time state flag when transmission error of the consecutive N≥1 preceding packet(s) from a DRB are detected.

In an example embodiment, a MAC entity may raise a normal state flag when successful transmission of the consecutive N≥1 preceding packet(s) from a DRB are detected.

In an example embodiment, depending on whether only one or both MAC entities are involved in transmission of data from the DRB, the corresponding PDCP entity may trigger survival time state or normal state based on flags raised by one or two MAC entities.

In an example embodiment, state triggering may be according to one of the following rules: at least one of the two MAC entities raising a flag; both MAC entities having the same flag raised; MAC entity associating to a specific RLC raising a flag; MAC entity associating to the primary RLC raising a flag; or MAC entity associating to RLC entity(ies) other than the primary RLC raising a flag. It may be noted that a MAC entity may raise a flag, for example, due to erroneous reception or due to multiple consecutive erroneous receptions.

A state change may be triggered by an indication received from only one MAC entity. Additionally or alternatively, a state change may be triggered by an indication received from a plurality of MAC entities. Whether a state change is triggered based on an indication received from one or multiple MAC entities may depend on how many MAC entities are currently associated to active RLC entities (i.e. RLC entities that are active for a current state of the DRB/UE).

In an example embodiment, while in normal state, (e.g. PDCP) survival time state may be triggered according to one of the following rules: a single PDCP entity is erroneous; a single or both MAC entities are erroneous; or all or a certain number of CCs or RLC entities are erroneous.

In an example embodiment, while in survival time state, (e.g. PDCP) normal state may be triggered according to one of the following rules: a single PDCP entity is non-erroneous; a single MAC entity associated to normal mode RLCs is non-erroneous; or one or more CCs or RLC entities associated to the set of normal mode RLCs are non-erroneous.

In an example embodiment, a packet duplication configuration may include a number of CCs/RLCs/MACs required to be erroneous before triggering the survival time state.

In example an embodiment, a packet duplication configuration may include a number CCs/RLCs/MACs (associated to normal mode RLCs) required to be non-erroneous before triggering the normal state.

In the present disclosure, the terms "positive feedback," "positive HARQ feedback," "a flag about successful transmission," "non-erroneous" may be used interchangeably. In the present disclosure, being non-erroneous may refer, for example, to N consecutive successful transmissions, or no errors being detected before a timer expires. In the present disclosure, the terms "negative feedback," "negative HARQ feedback," "unsuccessful transmission," and "erroneous" may be used interchangeably. In the present disclosure, being erroneous may refer, for example, to N consecutive errors occur, or error is detected while timer is running, or when timer expires. A survival time timer may be started, for example, when a packet arrives for transmission, or when an error is detected.

FIG. 8 illustrates the potential steps of an example method 800. The example method 800 may include: determining a number of medium access control entities associated with at least one active radio link control entity of a radio bearer, 810; determining at least one condition for switching a state associated with the radio bearer based, at least partially, on the determined number of medium access control entities, 820; determining that the determined at least one condition for switching the state associated with the radio bearer is satisfied, 830; and switching the state associated with the radio bearer from a first state to a second state based, at least partially, on determining that the at least one condition for switching the state associated with the radio bearer is satisfied, 840.

In accordance with one example embodiment, an apparatus may comprise: at least one processor; and at least one memory including computer program code; the at least one memory and the computer program code configured to, with the at least one processor, cause the apparatus at least to perform: determine a number of medium access control entities associated with at least one active radio link control entity of a radio bearer; determine at least one condition for switching a state associated with the radio bearer based, at least partially, on the determined number of medium access control entities; determine that the determined at least one condition for switching the state associated with the radio bearer is satisfied; and switch the state associated with the radio bearer from a first state to a second state based, at least partially, on determining that the at least one condition for switching the state associated with the radio bearer is satisfied.

The first state may comprise a normal state, wherein the second state may comprise a survival time state.

The first state may comprise a survival time state, wherein the second state comprises a normal state.

The at least one condition for switching the state associated with the radio bearer may comprise at least one of: a determination that a packet is successfully or not successfully delivered, a determination that one of the determined number of medium access control entities has provided an indication, relating to switching the state associated with the radio bearer, to an upper layer, or a determination that more than one of the determined number of medium access control entities have provided an indication, relating to switching the state associated with the radio bearer, to an upper layer.

The provided indication, relating to switching the state associated with the radio bearer, may comprise an indication based on reception of a control signal from at least one network node.

The example apparatus may be further configured to: transmit at least one packet with at least one radio link control entity associated with a current state associated with the radio bearer.

The example apparatus may be further configured to: receive a configuration message relating to packet duplication.

The received configuration message relating to packet duplication may comprise, at least, a first set of radio link control entities to be activated in the first state, and a second set of radio link control entities to be activated in the second state, wherein the second set may be at least partially different from the first set, wherein at least one of the first set or the second set may comprise radio link entities associated with a plurality of medium access control entities.

The at least one condition for switching the state associated with the radio bearer may be based, at least partially, on the received configuration message relating to packet duplication.

The received configuration message relating to packet duplication may comprise an indication that the at least one condition requires a reception of a predetermined number of one of: indications of erroneous transmissions, or indications of non-erroneous transmissions.

The received configuration message relating to packet duplication may comprise an indication that the required reception is required to be received from one of: component carriers, radio link control entities, or medium access control entities.

The at least one condition for switching the state associated with the radio bearer may comprise receiving at least one of: at least one first indication that a first predetermined number of transmission errors from the radio bearer have been detected, or at least one second indication that a second predetermined number of successful transmissions from the radio bearer have been detected.

The at least one condition for switching the state associated with the radio bearer may comprise receiving one of: the at least one first indication, or the at least one second indication from one of: at least one of the determined number of medium access control entities, a third predetermined number of the determined number of medium access control entities, all of the determined number of medium access control entities, a medium access control entity of the determined number of medium access control entities that is associated with a primary radio link control entity, or a medium access control entity of the determined number of medium access control entities that is not associated with the primary radio link control entity.

The at least one condition for switching the state associated with the radio bearer apparatus may comprise receiving, from at least one medium access control entity of the determined number of medium access control entities, a survival time state flag.

The at least one condition for switching the state associated with the radio bearer may comprise receiving, from at least one medium access control entity of the determined number of medium access control entities, a normal state flag.

The determined number of medium access control entities may comprise one medium access control entity, wherein the at least one condition for switching the state associated with the radio bearer may comprise: receiving an indication to switch the state associated with the radio bearer from the one medium access control entity.

The determined number of medium access control entities may comprise two medium access control entities, wherein the at least one condition for switching the state associated with the radio bearer may comprise at least one of: receiving an indication to switch the state associated with the radio bearer from a first medium access control entity of the two medium access control entities; or receiving an indication to switch the state associated with the radio bearer from a second medium access control entity of the two medium access control entities.

In accordance with one aspect, an example method may be provided comprising: determining a number of medium access control entities associated with at least one active radio link control entity of a radio bearer; determining at least one condition for switching a state associated with the radio bearer based, at least partially, on the determined number of medium access control entities; determining that the determined at least one condition for switching the state associated with the radio bearer is satisfied; and switching the state associated with the radio bearer from a first state to a second state based, at least partially, on determining that the at least one condition for switching the state associated with the radio bearer is satisfied.

The first state may comprise a normal state, wherein the second state may comprise a survival time state.

The first state may comprise a survival time state, wherein the second state may comprise a normal state.

The at least one condition for switching the state associated with the radio bearer may comprise at least one of: a determination that a packet is successfully or not successfully delivered, a determination that one of the determined number of medium access control entities has provided an indication, relating to switching the state associated with the radio bearer, to an upper layer, or a determination that more than one of the determined number of medium access control entities have provided an indication, relating to switching the state associated with the radio bearer, to an upper layer.

The provided indication, relating to switching the state associated with the radio bearer, may comprise an indication based on reception of a control signal from at least one network node.

The example method may further comprise: transmitting at least one packet with at least one radio link control entity associated with a current state associated with the radio bearer.

The example method may further comprise: receiving a configuration message relating to packet duplication.

The received configuration message relating to packet duplication may comprise, at least, a first set of radio link control entities to be activated in the first state, and a second set of radio link control entities to be activated in the second state, wherein the second set may be at least partially different from the first set, wherein at least one of the first set or the second set may comprise radio link entities associated with a plurality of medium access control entities.

The at least one condition for switching the state associated with the radio bearer may be based, at least partially, on the received configuration message relating to packet duplication.

The received configuration message relating to packet duplication may comprise an indication that the at least one condition requires a reception of a predetermined number of one of: indications of erroneous transmissions, or indications of non-erroneous transmissions.

The received configuration message relating to packet duplication may indication that the required reception is required to be received from one of: component carriers, radio link control entities, or medium access control entities.

In accordance with one example embodiment, an apparatus may comprise: circuitry configured to perform: determine a number of medium access control entities associated with at least one active radio link control entity of a radio bearer; determine at least one condition for switching a state associated with the radio bearer based, at least partially, on the determined number of medium access control entities; determine that the determined at least one condition for switching the state associated with the radio bearer is satisfied; and switch the state associated with the radio bearer from a first state to a second state based, at least partially, on determining that the at least one condition for switching the state associated with the radio bearer is satisfied.

In accordance with one example embodiment, an apparatus may comprise: processing circuitry; memory circuitry including computer program code, the memory circuitry and the computer program code configured to, with the processing circuitry, enable the apparatus to: determine a number of medium access control entities associated with at least one active radio link control entity of a radio bearer; determine at least one condition for switching a state associated with the radio bearer based, at least partially, on the determined number of medium access control entities; determine that the determined at least one condition for switching the state associated with the radio bearer is satisfied; and switch the state associated with the radio bearer from a first state to a second state based, at least partially, on determining that the at least one condition for switching the state associated with the radio bearer is satisfied.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory (ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

In accordance with one example embodiment, an apparatus may comprise means for performing: determining a number of medium access control entities associated with at least one active radio link control entity of a radio bearer; determining at least one condition for switching a state associated with the radio bearer based, at least partially, on the determined number of medium access control entities; determining that the determined at least one condition for switching the state associated with the radio bearer is satisfied; and switching the state associated with the radio bearer from a first state to a second state based, at least partially, on determining that the at least one condition for switching the state associated with the radio bearer is satisfied.

In accordance with one example embodiment, a non-transitory computer-readable medium comprising program instructions stored thereon which, when executed with at least one processor, cause the at least one processor to: determine a number of medium access control entities associated with at least one active radio link control entity of a radio bearer; determine at least one condition for switching a state associated with the radio bearer based, at least partially, on the determined number of medium access control entities; determine that the determined at least one condition for switching the state associated with the radio bearer is satisfied; and cause switching of the state associated with the radio bearer from a first state to a second state based, at least partially, on determining that the at least one condition for switching the state associated with the radio bearer is satisfied.

The first state may comprise a normal state, wherein the second state may comprise a survival time state.

The first state may comprise a survival time state, wherein the second state may comprise a normal state.

The at least one condition for switching the state associated with the radio bearer may comprise at least one of: a determination that a packet is successfully or not successfully delivered, a determination that one of the determined number of medium access control entities has provided an indication, relating to switching the state associated with the radio bearer, to an upper layer, or a determination that more than one of the determined number of medium access control entities have provided an indication, relating to switching the state associated with the radio bearer, to an upper layer.

The provided indication, relating to switching the state associated with the radio bearer, may comprise an indication based on reception of a control signal from at least one network node.

The example non-transitory computer-readable medium may be further configured to: cause transmission of at least one packet with at least one radio link control entity associated with a current state associated with the radio bearer.

The example non-transitory computer-readable medium may be further configured to: cause receiving of a configuration message relating to packet duplication.

The received configuration message relating to packet duplication may comprise, at least, a first set of radio link control entities to be activated in the first state, and a second set of radio link control entities to be activated in the second state, wherein the second set may be at least partially different from the first set, wherein at least one of the first set or the second set may comprise radio link entities associated with a plurality of medium access control entities.

The at least one condition for switching the state associated with the radio bearer may be based, at least partially, on the received configuration message relating to packet duplication.

The received configuration message relating to packet duplication may comprise an indication that the at least one condition requires a reception of a predetermined number of one of: indications of erroneous transmissions, or indications of non-erroneous transmissions.

The received configuration message relating to packet duplication may comprise an indication that the required reception is required to be received from one of: component carriers, radio link control entities, or medium access control entities.

In accordance with another example embodiment, a non-transitory program storage device readable by a machine may be provided, tangibly embodying a program of instructions executable by the machine for performing operations, the operations comprising: determine a number of medium access control entities associated with at least one active radio link control entity of a radio bearer; determine at least one condition for switching a state associated with the radio bearer based, at least partially, on the determined number of medium access control entities; determine that the determined at least one condition for switching the state associated with the radio bearer is satisfied; and cause switching of the state associated with the radio bearer from a first state to a second state based, at least partially, on determining that the at least one condition for switching the state associated with the radio bearer is satisfied.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modification and variances which fall within the scope of the appended claims.

What is claimed is:

1. A user equipment comprising:
at least one processor; and
at least one memory storing instructions that, when executed with the at least one processor, cause the user equipment at least to:
determine a number of medium access control entities associated with at least one active radio link control entity of a radio bearer;
determine at least one condition for switching a state associated with the radio bearer based, at least partially, on the determined number of medium access control entities, wherein the at least one condition comprises a determination that a packet is successfully or not successfully delivered;
determine that the determined at least one condition for switching the state associated with the radio bearer is satisfied;
switch the state associated with the radio bearer from a first state, wherein the first state comprises a normal state, to a second state, wherein the second state comprises a survival time state, based, at least partially, on determining that the at least one condition for switching the state associated with the radio bearer is satisfied; and
receive a configuration message relating to packet duplication, wherein the received configuration message relating to packet duplication comprises, at least, a first set of radio link control entities to be activated in the first state, and a second set of radio link control entities to be activated in the second state, wherein the second set is at least partially different from the first set, wherein at least one of the first set or the second set comprises radio link entities associated with a plurality of medium access control entities.

2. The user equipment of claim 1, wherein the at least one condition for switching the state associated with the radio bearer further comprises at least one of:
a determination that one of the determined number of medium access control entities has provided an indication, relating to switching the state associated with the radio bearer, to an upper layer, or a determination that more than one of the determined number of medium access control entities have provided the indication, relating to switching the state associated with the radio bearer, to the upper layer.

3. The user equipment of claim 2, wherein the provided indication, relating to switching the state associated with the radio bearer, comprises an indication based on reception of a control signal from at least one network node.

4. The user equipment of claim 1, wherein the instructions, when executed with the at least one processor, cause the user equipment at least to:
transmit at least one packet with at least one radio link control entity associated with a current state associated with the radio bearer.

5. The user equipment of claim 1, wherein the at least one condition for switching the state associated with the radio bearer is based, at least partially, on the received configuration message relating to packet duplication.

6. The user equipment of claim 1, wherein the received configuration message relating to packet duplication comprises an indication that the at least one condition requires a reception of a predetermined number of one of:
indications of erroneous transmissions, or
indications of non-erroneous transmissions.

7. The user equipment of claim 6, wherein the received configuration message relating to packet duplication comprises an indication that the required reception is required to be received from one of:
component carriers,
radio link control entities, or
medium access control entities.

8. A method for a user equipment comprising:
determining a number of medium access control entities associated with at least one active radio link control entity of a radio bearer;
determining at least one condition for switching a state associated with the radio bearer based, at least partially, on the determined number of medium access control entities, wherein the at least one condition comprises a determination that a packet is successfully or not successfully delivered;
determining that the determined at least one condition for switching the state associated with the radio bearer is satisfied;
switching the state associated with the radio bearer from a first state wherein the first state comprises a normal state, to a second state, wherein the second state comprises a survival time state, based, at least partially, on determining that the at least one condition for switching the state associated with the radio bearer is satisfied; and
receiving a configuration message relating to packet duplication, wherein the received configuration message relating to packet duplication comprises, at least, a first set of radio link control entities to be activated in the first state, and a second set of radio link control entities to be activated in the second state, wherein the second set is at least partially different from the first set, wherein at least one of the first set or the second set comprises radio link entities associated with a plurality of medium access control entities.

9. The method of claim 8, wherein the at least one condition for switching the state associated with the radio bearer comprises at least one of:
a determination that one of the determined number of medium access control entities has an provided indication, relating to switching the state associated with the radio bearer, to an upper layer, or a determination that more than one of the determined number of medium access control entities have provided the indication, relating to switching the state associated with the radio bearer, to the upper layer.

10. The method of claim 9, wherein the provided indication, relating to switching the state associated with the radio bearer, comprises an indication based on reception of a control signal from at least one network node.

11. The method of claim 8, further comprising:

transmitting at least one packet with at least one radio link control entity associated with a current state associated with the radio bearer.

12. The method of claim 8, wherein the at least one condition for switching the state associated with the radio bearer is based, at least partially, on the received configuration message relating to packet duplication.

13. The method of claim 8, wherein the received configuration message relating to packet duplication comprises an indication that the at least one condition requires a reception of a predetermined number of one of:

indications of erroneous transmissions, or indications of non-erroneous transmissions.

14. The method of claim 13, wherein the received configuration message relating to packet duplication comprises an indication that the required reception is required to be received from one of:

component carriers, radio link control entities, or medium access control entities.

15. A non-transitory computer-readable medium comprising instructions stored thereon for performing at least the following:

causing determining of a number of medium access control entities associated with at least one active radio link control entity of a radio bearer;

causing determining of at least one condition for switching a state associated with the radio bearer based, at least partially, on the determined number of medium access control entities, wherein the at least one condition comprises a determination that a packet is successfully or not successfully delivered;

causing determining that the determined at least one condition for switching the state associated with the radio bearer is satisfied;

causing switching of the state associated with the radio bearer from a first state wherein the first state comprises a normal state, to a second state, wherein the second state comprises a survival time state, based, at least partially, on determining that the at least one condition for switching the state associated with the radio bearer is satisfied; and causing receiving of a configuration message relating to packet duplication, wherein the received configuration message relating to packet duplication comprises, at least, a first set of radio link control entities to be activated in the first state, and a second set of radio link control entities to be activated in the second state, wherein the second set is at least partially different from the first set, wherein at least one of the first set or the second set comprises radio link entities associated with a plurality of medium access control entities.

16. The non-transitory computer-readable medium of claim 15, wherein the at least one condition for switching the state associated with the radio bearer further comprises at least one of:

a determination that one of the determined number of medium access control entities has provided an indication, relating to switching the state associated with the radio bearer, to an upper layer, or a determination that more than one of the determined number of medium access control entities have provided the indication, relating to switching the state associated with the radio bearer, to the upper layer.

17. The non-transitory computer-readable medium of claim 16, wherein the provided indication, relating to switching the state associated with the radio bearer, comprises an indication based on reception of a control signal from at least one network node.

18. The non-transitory computer-readable medium of claim 15, further comprising instructions stored thereon for performing:

causing transmitting of at least one packet with at least one radio link control entity associated with a current state associated with the radio bearer.

19. The non-transitory computer-readable medium of claim 15, wherein the at least one condition for switching the state associated with the radio bearer is based, at least partially, on the received configuration message relating to packet duplication.

20. The non-transitory computer-readable medium of claim 15, wherein the received configuration message relating to packet duplication comprises an indication that the at least one condition requires a reception of a predetermined number of one of:

indications of erroneous transmissions, or indications of non-erroneous transmissions.

* * * * *